United States Patent [19]

McKenna et al.

[11] Patent Number: 5,362,953
[45] Date of Patent: Nov. 8, 1994

[54] READING APPARATUS WITH SEPARATE ILLUMINATION AND DETECTION OPTICAL AXES

[75] Inventors: Patrick M. McKenna, Mukilteo, Wash.; Robert W. Rudeen, Eugene, Oreg.; David W. Gilpin, Everett, Wash.

[73] Assignee: Intermec Corporation, Everett, Wash.

[21] Appl. No.: 931,767

[22] Filed: Aug. 18, 1992

[51] Int. Cl.⁵ .............................................. G06K 7/10
[52] U.S. Cl. ..................................... 235/472; 250/569
[58] Field of Search ............................ 235/462, 472; 250/227.13, 568, 569

[56] References Cited

U.S. PATENT DOCUMENTS

| | | | |
|---|---|---|---|
| 2,039,406 | 5/1936 | Greensfelder | 197/6.1 |
| 2,325,941 | 8/1943 | Dickinson . | |
| 2,983,446 | 5/1961 | Zogg . | |
| 3,676,690 | 7/1972 | McMillin et al. | 250/569 |
| 3,784,794 | 1/1974 | Allais . | |
| 3,784,832 | 1/1974 | Sewell | 250/226 |
| 3,808,447 | 4/1974 | Leavens, Jr. | 250/569 |
| 3,809,863 | 5/1974 | Oberg . | |
| 3,870,865 | 3/1975 | Schneiderhan et al. . | |
| 3,916,184 | 10/1975 | Turner et al. | 250/227 |
| 4,074,114 | 2/1978 | Dobras | 235/463 |
| 4,115,703 | 9/1978 | Dobras | 250/568 |
| 4,143,809 | 3/1979 | Uebbing et al. | 235/462 |
| 4,346,292 | 8/1982 | Routt, Jr. et al. | 250/216 |
| 4,603,262 | 7/1986 | Eastman et al. | 250/566 |
| 4,675,531 | 6/1987 | Clark et al. | 250/568 |

FOREIGN PATENT DOCUMENTS

| 183791 | 7/1989 | Japan | 235/462 |
|---|---|---|---|
| 85869 | 4/1991 | Japan | 235/462 |

*Primary Examiner*—John Shepperd
*Attorney, Agent, or Firm*—Seed and Berry

[57] ABSTRACT

An apparatus for reading a bar code symbol with an illumination beam of light. The apparatus includes an integrally formed lens with a first lens surface for transmitting the beam of light toward the bar code symbol along an optical axis and second and third lens surfaces for receiving any of the beam of light that is reflected from the bar code symbol and transmitting the received light along two distinct optical paths to two photodiodes. The two distinct optical paths are separated from each other and not aligned with the optical axis. The configuration of lenses provides an improved depth of field.

35 Claims, 4 Drawing Sheets

5,362,953

READING APPARATUS WITH SEPARATE ILLUMINATION AND DETECTION OPTICAL AXES

TECHNICAL FIELD

The present invention is directed to a wand for reading bar code symbols, and more particularly, to a wand having an improved optics system.

BACKGROUND OF THE INVENTION

A bar code wand reads a bar code symbol over which it is drawn by illuminating the symbol with a beam of light and detecting the amount of the illuminating light that is reflected from the symbol. In essence, a bar code symbol generally consists of an alternating series of reflective and nonreflective bars arrayed in a linear pattern. The variations in reflective and nonreflective bars determines the amount of reflected light that is detected as the illuminating light scans the bar code symbol. The detected light can be converted into an electrical signal which is processed to determine the information contained in the symbol. The variations in the amount of reflected light contain information in the form of variations in duration of the electrical signals produced when the bar code wand is drawn across the bar code symbol.

Conventionally, the bar code symbol is illuminated by a single beam of light projected through a lens and the reflected light is received along the same optical path. The illumination beam is generated by a light source such as a laser diode, which is then shaped to a desired form by passage through one or more apertures and associated lenses for focusing the beam at a focal point having a desired range. It is recognized that the focus of the beam degrades as the wand is moved so that the bar code symbol being scanned is no longer precisely at the focal point. However, there is a range of distances, called the "depth of field," within which the bar code wand can be moved and still have the illumination beam sufficiently close that the bar code symbol can be accurately read. The depth of field is centered about the focal point; therefore, a wand can be used to read bar code symbols which are at distances other than exactly at the focal point.

The performance of a bar code wand is affected by the optical path along which the reflected light travels. Of significant importance is the amount of the reflected light received by the lens of the bar code wand that is transmitted to the light detectors utilized.

In the past, bar code symbols were sometimes illuminated along more than one path. However, both this and the conventional single path approach suffer from a limited depth of field. This results in the bar code wand being useful only over a range. It has been discovered that placing a plurality of detection optical axes at an angle to the lens of the wand can increase the distance over which a bar code wand can be used.

The present invention provides an improved apparatus for reading bar symbols with separate illumination and detection optical axes.

SUMMARY OF THE INVENTION

According to one aspect, the invention is an apparatus for reading a bar code symbol. The apparatus comprises first, second and third optical means, first and second transducers, and holder means. The first optical means receives an illumination beam of light and transmits the illumination beam of light therethrough along an optical axis onto the bar code symbol. The second optical means receives a first portion of the light from the illumination beam of light reflected from the bar code symbol along a first return optical path commencing at the bar code symbol, and transmits the first portion of the reflected light therethrough and along the first return optical path. The third optical means receives a second portion of the light from the illumination beam of light reflected from the bar code symbol along a second return optical path commencing at the bar code symbol. The second return optical path is distinct from the first return optical path. The third optical means also transmits the second portion of the reflected light therethrough and along the second return optical path. The first and second return optical paths are offset from the optical axis. The first transducer is positioned away from the optical axis and along the first return optical path, and receives the first portion of the reflected light transmitted through the second optical means along the first return optical path. The second transducer is positioned away from one optical axis along the second return optical path, and receives the second portion of the reflected light transmitted through the third optical means along the second return optical path. The holder means holds the first, second and third optical means in fixed positions relative to each other and to the optical axis.

DETAILED DESCRIPTION OF THE INVENTION

Figure 1:
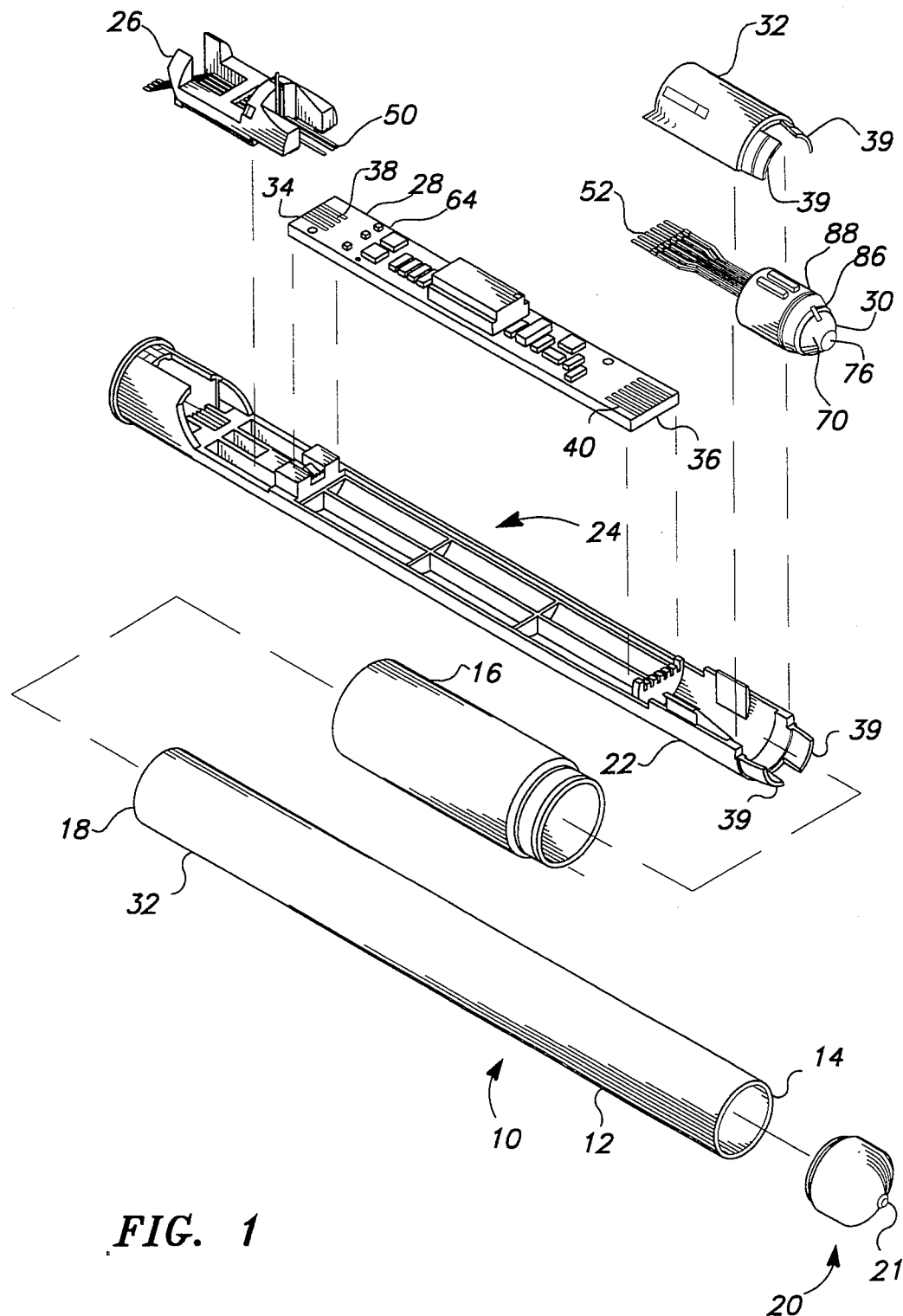
FIG. 1 is an exploded perspective view of a bar code wand according to the present invention.

A wand 10 according to the present invention is shown in FIG. 1. The wand 10 is sheathed in an outer wand barrel 12 having forward and rearward ends 14 and 18, respectively. The outer wand barrel 12 has a tip assembly 20 attached at the forward end 14 and has a barrel jacket 16 positioned toward the rearward end 18. The tip assembly 20 holds a transparent jewel or window 21 which can be used to contact a surface upon which a bar code symbol to be read is printed. The barrel jacket 16 is used to promote an adequate grip on the wand 10 by a person using the wand to read bar code symbols.

The outer wand barrel 12 receives therewithin through the rearward end 18 a carrier 22. The carrier 22 is elongated to fit inside the outer wand barrel 12 and has a cut-out portion 24 which is adapted to carry a contact assembly 26, a circuit assembly 28, an optics assembly 30 and an optics assembly cover 32. The circuit assembly 28 has a rearward end 34 with a plurality of electrical contacts 38 and a forward end 36 with a plurality of electrical contacts 40. The tip assembly 20 is held in place in the forward end 14 of the wand 10 by mechanically engaging a plurality of resilient beams 39 of the carrier 22 and the optics assembly cover 32.

The contact assembly 26 has a plurality of parallel arranged wires 50 which align with and have one end contacting the electrical contacts 38 of the circuit assembly 28. The wires 50 project fully through the contact assembly 26 and have their opposite end forming the contact portion of an RJ-type connector when the contact assembly 26 is assembled with the circuit assembly 28 and positioned on the carrier 22.

Figure 8:
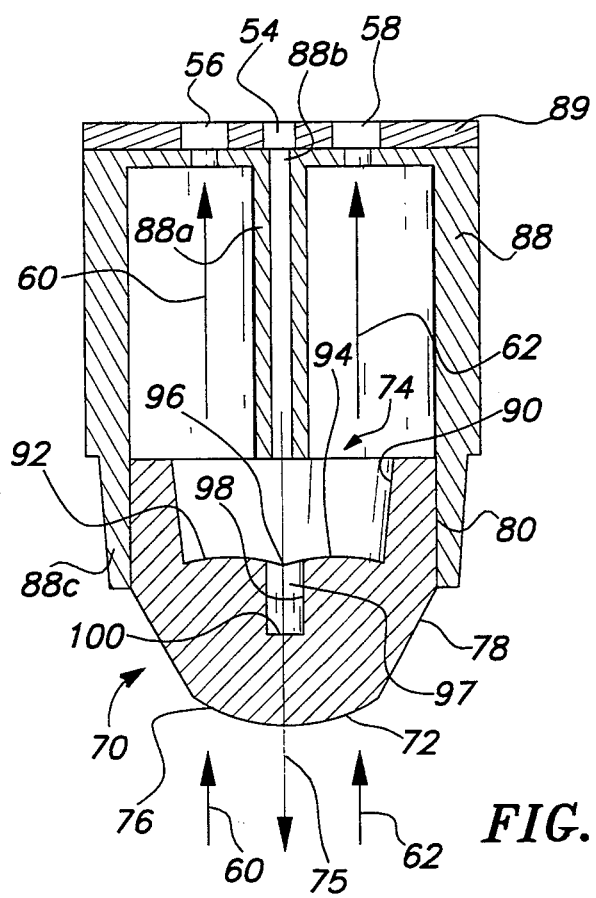
FIG. 8 is a cross-sectional view of the lens of FIG. 2 taken along the section lines 8—8 of FIG. 5 shown held by a lens carrier.

The optics assembly 30 has a plurality of parallel arranged wires 52 which align with and have one end contacting the plurality of electrical contacts 40 of the circuit assembly 28. The wires 52 connect to the electronic components of optics assembly 30. These components include a light-emitting diode 54 and first and second photodiodes 56 and 58, respectively (schematically shown in FIG. 8). The light-emitting diode 54 projects an illumination beam of light through the window 21 of the assembly 20. The two photodiodes 56 and 58 each receive a portion of the illumination light that is reflected by the bar code symbol along one of two separate and distinct optical paths 60 and 62, respectively, as shown in FIG. 8, which extend between the bar code symbol and the two photodiodes. The two photodiodes 56 and 58 produce electrical signals which represent the information contained in a bar code symbol which is being read.

The circuit assembly 28 includes a printed circuit (PC) board 64 with electronic components mounted thereon. The electronic components on the PC board 64 produce electrical signals to drive the light-emitting diode of the optics assembly 30 and process the electrical signals generated by the two photodiodes 56 and 58 of the optics assembly.

Figure 2:
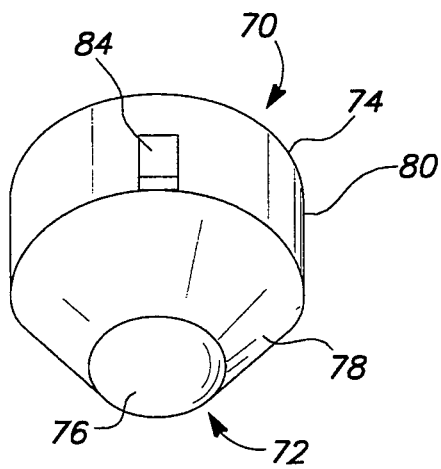
FIG. 2 is an enlarged front perspective view of a lens of the wand of FIG. 1.

The optics assembly 30 includes a lens 70 made from a clear acrylic plastic. As best shown in FIG. 2, the lens 70 has a forward end 72 and a rearward end 74 and is formed generally symmetrically about a central longitudinal lens axis 75 illustrated in FIG. 8. A forwardly protruded convex tip surface 76 is located at the forward end 72 of the lens 70 concentric with the lens axis 75 and comprises a portion of a spherical surface. Rearward of the tip surface 76 is a conical surface 78 which is also concentric with the lens axis 75. Extending from the conical surface 78 to the rearward end 74 of the lens 70, concentric about the lens axis 75, is a cylindrical surface 80. In the illustrated preferred embodiment of the invention, the tip surface 76 has a curvature of −5.6378. The conical surface 78 has a bevel of 34.7 degrees. The diameter of the cylindrical surface 80 is 0.2530 inch, with a tolerance of plus 0.0010 or minus 0.0014 inch. The axial extent of the cylindrical surface 80 is 0.100 inch, with a tolerance of plus 0.003 or minus 0.002 inch.

Figure 4:
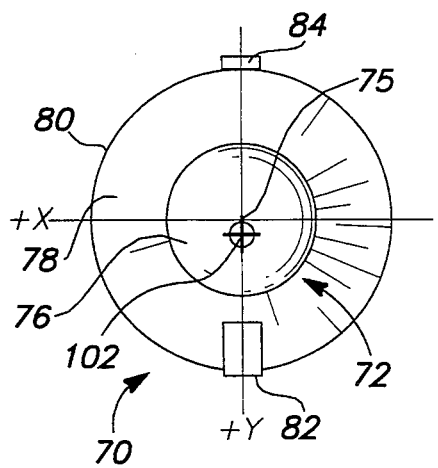
FIG. 4 is a front plan view of the lens of FIG. 2.

As best shown in FIG. 4, cylindrical surface 80 has a projection 84 extending outwardly. The projection 84 fits within depression 86 in a lens carrier 88 forming a part of the optics assembly 30 to prevent the lens 70 from rotating within the optics assembly.

The lens carrier 88 holds the lens 70 in a fixed position relative to the laser diode 54 and the first and second photodiodes 56 and 58. As shown in FIG. 8, the lens carrier 88 includes a baffle 88a positioned to not interrupt the portion of the illumination light from the laser diode 54 that is reflected from the bar code symbol along each of the two separate optical paths 60 and 62. The baffle 88a has an aperture 88b through which the illumination beam of light is projected forwardly along the optical axis 102 (see FIGS. 4 and 5) by the laser diode 54 passes before it is received by a convex spherical surface 100 of the lens 70 (which will be described below). The baffle 88a with the aperture 88b therein substantially eliminate any amount of the illumination beam of light from reaching the two aspheric surfaces 92 and 94 without first being transmitted through the convex spherical surface 100 along an optical axis 102 thereof and out through the tip surface 76 at the forward end 72 of the lens 70 and onto the bar code symbol.

The lens carrier 88 has a receiver portion 88c at a forward end adapted to receive the lens 70 therein. The lens carrier 88 has a retainer 89 at a rearward end that keeps the laser diode 54 and the first and second photodiodes 56 and 58 in fixed position relative to one another.

Figure 3:
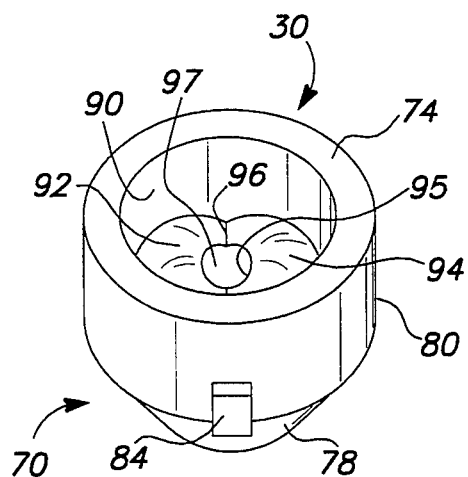
FIG. 3 is a rear perspective view of the lens of FIG. 2 shown rotated 90° from the view shown in FIG. 2.

As shown in FIG. 3, the lens 70 has a conical inner surface 90, which extends forward from the rearward end 74 of the lens and is concentric with the lens axis 75. The conical inner surface 90 is coaxial and substantially coextensive with the cylindrical surface 80. The conical inner surface 90 has a slight forward taper from the rearward end 74 of the lens 70, as best shown in FIG. 8, and terminates at the two mirror image aspheric convex surfaces 92 and 94, respectively, which are oriented generally transverse to the lens axis 75, as best shown in FIGS. 3 and 5–8. The two aspheric surfaces 92 and 94 meet to define a planar curve 96 lying in a plane parallel to the lens axis 75. A central cylindrical cavity 97 having a cylindrical sidewall surface 98 extends longitudinally from the two aspheric surfaces 92 and 94, at a location on the curve 96, offset from the lens axis 75. The central cylindrical cavity 97 terminates at a forward end in a rearwardly protruding convex surface 100. In the illustrated preferred embodiment, the diameter of the cylindrical surface 98 is 0.040 inch. The surface 100 has a curvature of 17.1410.

The illumination beam of light produced by the light-emitting diode 54 is projected forwardly along an optical axis 102 (see FIGS. 4 and 5) of the convex spherical surface 100 and out through the tip surface 76 at the forward end 72 of the lens 70, as shown schematically in FIG. 8. Any reflected light is also received through the tip surface 76. The reflected light received by the tip surface 76 travels rearwardly through both the two aspheric surfaces 92 and 94, which define the two separate and distinct optical paths 60 and 62 for the return reflected light. The light traveling along optical path 60 is received by the first photodiode 56, and the light traveling along optical path 62 is received by the second photodiode 58.

Figure 5:
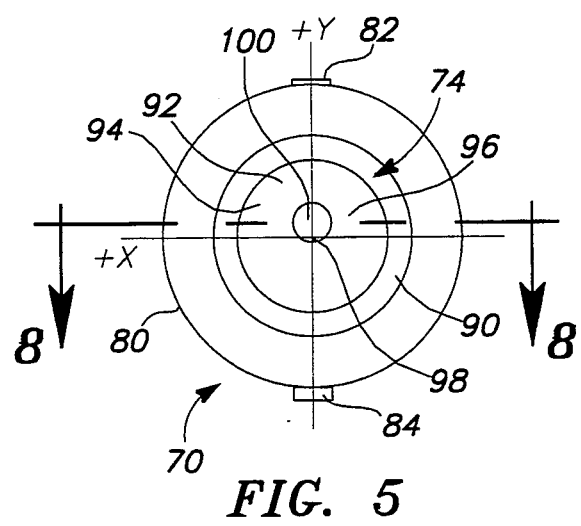
FIG. 5 is a rear plan view of the lens of FIG. 2.
Figure 6:
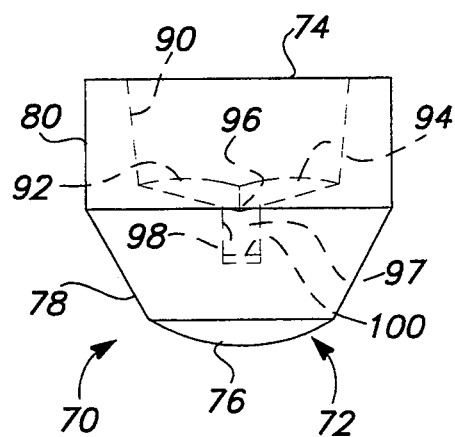
FIG. 6 is a side elevational view of the lens of FIG. 2.
Figure 7:
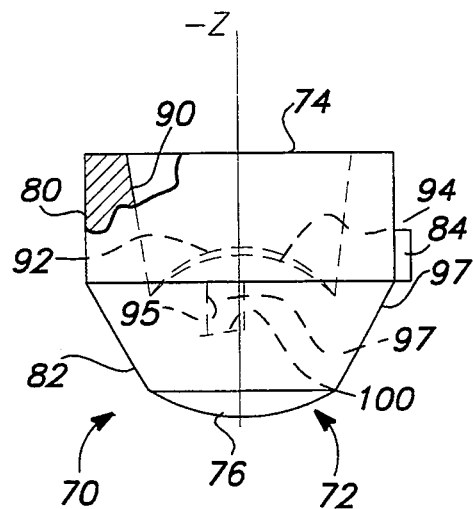
FIG. 7 is a side elevational view of the lens of FIG. 2 shown rotated 90° from the view shown in FIG. 6.

For purposes of reference, a three-dimensional coordinate system has been established relative to the lens 70 to define the surfaces in the lens. The three mutually orthogonal axes of the coordinate system are designated x, y and z and are labeled as such in FIGS. 4, 5, and 7. The z axis is coincident with the lens axis 75. The x and y axes lie in a plane at the rearward end 74 of the lens 70. As shown in FIG. 5, the y axis lies in the plane of the planar curve 96. The aspheric surface 92 has its apex at x=+0.039 inch, y=+0.0046 inch, and z=+0.075 inch. The aspheric surface 94 has its apex at x=−0.039 inch, y=+0.0046 inch, and z=+0.075 inch. Both of the two aspheric surfaces 92 and 94 are defined by the formula for an aspheric surface:

$$H=z+(c*r^2/(1+SQRT(1-s*c^2*r^2)))$$, where H is the surface height in inches (measured in the direction of the z axis), z is the coordinate value given above, r is the radial distance from the apex of the aspheric surface, c=11.7714 (lens curvature), and s=0.043 (aspheric coefficient).

The lens 70 is made from a single integral piece of acrylic plastic, which thereby assures that each of the lens surfaces 76, 78, 80, 90, 92, 94, 98, and 100 is held in fixed position relative to the other optical surfaces.

Figure 9:
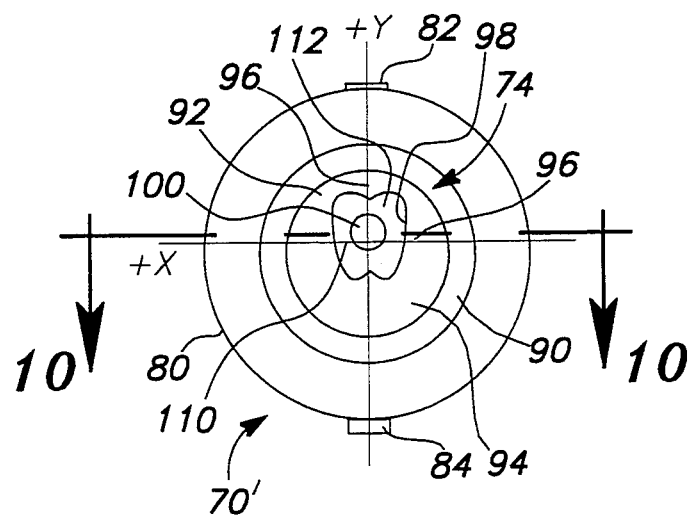
FIG. 9 is a rear plan view of a second lens of a bar code wand according to the present invention.
Figure 10:
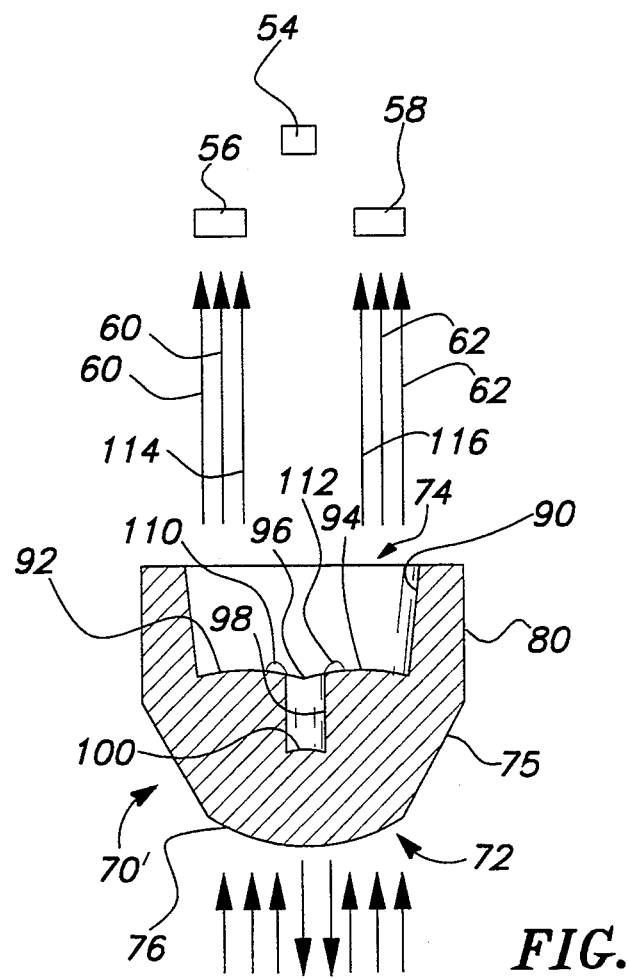
FIG. 10 is a cross-sectional view of the lens of FIG. 9, taken along the section lines 10—10 in FIG. 9.

A second preferred embodiment of a lens 70' made according to the present invention is shown in FIGS. 9 and 10. Portions of and optical paths through the lens 70' which have the same general shape and function as the corresponding portions of and optical paths through the previously described lens 70 are similarly numbered for purposes of convenience. In this second preferred embodiment, the lens 70' has further aspheric surfaces 110 and 112, respectively, as shown in FIG. 10, in addition to the two aspheric surfaces 92 and 94. The further aspheric surfaces 110 and 112 are exaggerated for illustrative purposes. The aspheric surface 110 has its apex at x=+0.032 inch, y=+0.0088 inch, and z=+0.075 inch. The aspheric surface 112 has its apex at x=−0.032 inch, y=+0.0088 inch, and z=+0.075 inch. In addition, each of the aspheric surfaces 110 and 112 is defined by the formula given above using s=−0.578 (aspheric coefficient).

In the second embodiment, the return light passing through the tip surface 76 passes along four distinct return optical paths to the photodiodes 56 and 58. As shown in connection with the embodiment of FIGS. 1-8, one of the return optical paths 60 passes through the aspheric surface 92 to the first photodiode 56, while another of the return optical paths 62 passes through the aspheric surface 94 to the second photodiode 58. Further light on another return optical path 114 through the aspheric surface 110 also passes to the first photodiode 56, and still further light on a still further return optical path 116 through the aspheric surface 112 passes to the second photodiode 58.

The wand 10 of this second embodiment is designed to be usable with a bar code symbol located within a range of distances from the lens 70' along the optical axis 102. The wand can operate well within a range of distances from a selected first distance to a selected second distance greater than the first distance by selecting the two aspheric surfaces 92 and 94 to focus light reflected from the bar code symbol when at the second distance from the lens 70' and by selecting the two aspheric surfaces 110 and 112 to focus light reflected from the bar code symbol when at the first distance from the lens 70'. The total amount of light contained in the four portions of the reflected light is substantially constant regardless of where the bar code symbol is located within the range of distances from the lens 70'.

As indicated above, detailed illustrative embodiments are disclosed herein. However, other embodiments, which may be detailed rather differently from the disclosed embodiments, are possible. Consequently, the specific structural and functional details disclosed herein are merely representative: yet in that regard, they are deemed to afford the best embodiments for the purposes of disclosure and to provide a basis for the claims herein, which define the scope of the present invention.

We claim:

1. An apparatus for reading a bar code symbol containing information, comprising:
    a light source generating an illumination beam of light along an optical axis;
    a first optical element for receiving the illumination beam of light and transmitting the illumination beam of light therethrough along the optical axis onto the bar code symbol;
    a second optical element for receiving a first portion of the light from the illumination beam of light reflected from the bar code symbol along a first return optical path commencing at the bar code symbol, and transmitting the first portion of the reflected light therethrough and along the first return optical path;
    a third optical element for receiving a second portion of the light from the illumination beam of light reflected from the bar code symbol along a second return optical path commencing at the bar code symbol, the third optical element being in close proximity with the second optical element but spaced apart from the second optical element sufficient to permit the illumination beam of light to pass therebetween, the second return optical path being distinct from the first return optical path and transmitting the second portion of the reflected light therethrough and along the second return optical path, the first and second return optical paths each being offset from the optical axis but adjacent thereto;
    a first transducer positioned away from the optical axis and along the first return optical path, and receiving the first portion of the reflected light transmitted through the second optical element along the first return optical path, the first transducer converting the first portion of the reflected light into an electrical signal representative of the full information contained on the bar code symbol;
    a second transducer positioned away from the optical axis along the second return optical path, and receiving the second portion of the reflected light transmitted through the third optical element along the second return optical path, the second transducer converting the second portion of the reflected light into an electrical signal representative of the full information contained on the bar code symbol; and
    a holder holding the first, second and third optical elements in fixed positions relative to each other and to the optical axis, the first second and third optical elements being arranged substantially in the same plane.

2. An apparatus for reading a bar code symbol, comprising:
    a first optical element for receiving an illumination beam of light and transmitting the illumination beam of light therethrough along an optical axis onto the bar code symbol;
    a second optical element for receiving a first portion of the light from the illumination beam of light reflected from the bar code symbol along a first return optical path commencing at the bar code symbol, and transmitting the first portion of the reflected light therethrough and along the first return optical path;

a third optical element for receiving a second portion of the light from the illumination beam of light reflected from the bar code symbol along a second return optical path commencing at the bar code symbol, the second return optical path being distinct from the first return optical path and transmitting the second portion of the reflected light therethrough and along the second return optical path, the first and second return optical paths being offset from the optical axis;

a first transducer positioned away from the optical axis and along the first return optical path, and receiving the first portion of the reflected light transmitted through the second optical element along the first return optical path;

a second transducer positioned away from the optical axis along the second return optical path, and receiving the second portion of the reflected light transmitted through the third optical element along the second return optical path;

a holder holding the first, second and third optical elements in fixed positions relative to each other and to the optical axis; and an aperture element for generating the illumination beam of light before it is received by the first optical element and substantially eliminating any amount of the illumination beam of light reaching the second optical element or the third optical element without first being transmitted through the first optical element along the optical axis onto the bar code symbol, the aperture element being positioned between the first and second return optical paths.

3. The apparatus of claim 2 wherein the aperture element includes a baffle which does not interrupt the first and second portions of the light from the illumination beam of light reflected from the bar code symbol.

4. The apparatus of claim 2, further including a light beam generator that generates the illumination beam of light and transmits the illumination beam of light through the aperture element to the first optical element.

5. The apparatus of claim 4, wherein the first optical element includes a portion of a spherical surface positioned along the optical axis to receive the illumination beam of light.

6. An apparatus for reading a bar code symbol, comprising:

a first optical element for receiving an illumination beam of light and transmitting the illumination beam of light therethrough along an optical axis onto the bar code symbol;

a second optical element for receiving a first portion of the light from the illumination beam of light reflected from the bar code symbol along a first return optical path commencing at the bar code symbol, and transmitting the first portion of the reflected light therethrough and along the first return optical path, the second optical element including a first aspheric surface;

a third optical element for receiving a second portion of the light from the illumination beam of light reflected from the bar code symbol along a second return optical path commencing at the bar code symbol, the second return optical path being distinct from the first return optical path and transmitting the second portion of the reflected light therethrough and along the second return optical path, the third optical element including a second aspheric surface, the first and second return optical paths being offset from the optical axis;

a first transducer positioned away from the optical axis and along the first return optical path, and receiving the first portion of the reflected light transmitted through the second optical element along the first return optical path;

a second transducer positioned away from the optical axis along the second return optical path, and receiving the second portion of the reflected light transmitted through the third optical element along the second return optical path; and a holder holding the first, second and third optical elements in fixed position relative to each other and to the optical axis.

7. The apparatus of claim 6, wherein the first and second aspheric surfaces are positioned adjacent to each other with the optical axis therebetween.

8. The apparatus of claim 7, wherein the first and second aspheric surfaces meet in a plane containing the optical axis.

9. The apparatus of claim 8, wherein the second aspheric surface is a mirror image of the first aspheric surface.

10. An apparatus for reading a bar code symbol, comprising:

a first optical element for receiving an illumination beam of light and transmitting the illumination beam of light therethrough along an optical axis onto the bar code symbol, the first optical element including a portion of a spherical surface positioned along the optical axis to transmit the illumination beam of light onto the bar code symbol;

a second optical element for receiving a first portion of the light from the illumination beam of light reflected from the bar code symbol along a first return optical path commencing at the bar code symbol, and transmitting the first portion of the reflected light therethrough and along the first return optical path;

a third optical element for receiving a second portion of the light from the illumination beam of light reflected from the bar code symbol along a second return optical path commencing at the bar code symbol, the second return optical path being distinct from the first return optical path and transmitting the second portion of the reflected light therethrough and along the second return optical path, the first and second return optical paths being offset from the optical axis;

a first transducer positioned away from the optical axis and along the first return optical path, and receiving the first portion of the reflected light transmitted through the second optical element along the first return optical path;

a second transducer positioned away from the optical axis along the second return optical path, and receiving the second portion of the reflected light transmitted through the third optical element along the second return optical path; and a holder for holding the first, second and third optical elements in fixed positions relative to each other and to the optical axis.

11. The apparatus of claim 10, wherein the portion of the spherical surface also receives the first and second portions of reflected light prior to receipt thereof by the second and third optical elements.

12. An apparatus for reading a bar code symbol, comprising:
- a light source generating an illumination beam of light along an optical axis;
- a lens having a rearward facing first lens surface positioned along the optical axis receiving the illumination beam of light from the light source, a forward facing second lens surface positioned along the optical axis forward of the first lens surface transmitting the illumination beam of light to a position forward of the second lens surface onto the bar code symbol and receiving the illumination beam of light that is reflected toward the forward facing second lens from the bar code symbol along a first return optical path commencing at the bar code symbol and along a second return optical path commencing at the bar code symbol, a rearward facing third lens surface transmitting a first portion of the reflected light therethrough along the first return optical path and a rearward facing fourth lens surface transmitting a second portion of the reflected light therethrough along the second return optical path distinct from the first return optical path, the first and second return optical paths being offset from the optical axis;
- a first transducer positioned along the first return optical path rearward of the third lens surface and away from the optical axis, the first transducer receiving the first portion of the reflected light transmitted by the third lens surface along the first return optical path; and
- a second transducer positioned along the second return optical path rearward of the fourth lens surface and away from the optical axis, the second transducer receiving the second portion of the reflected light transmitted by the fourth lens surface along the second return optical path.

13. The apparatus of claim 12, wherein the lens is an integral unit formed from a transparent material.

14. The apparatus of claim 13, further comprising a holder that holds the lens in a fixed position relative to the light source and the first and second transducers.

15. The apparatus of claim 14, wherein the holder includes a receiver portion adapted to receive the lens.

16. The apparatus of claim 14, further comprising a retainer that keeps the light source and first and second transducers in fixed positions relative to one another.

17. The apparatus of claim 12, wherein the first lens surface is positioned forward of the third and fourth lens surfaces.

18. The apparatus of claim 17, wherein the first lens surface further includes a cavity.

19. The apparatus of claim 12, wherein the first lens surface is a portion of a first spherical surface.

20. The apparatus of claim 19, wherein the second lens surface is a portion of a second spherical surface.

21. The apparatus of claim 12 wherein the second return optical path is distinct and offset from the first return optical path.

22. An apparatus for reading a bar code symbol, comprising:
- a light source generating an illumination beam of light along an optical axis;
- a lens having a rearward facing first lens surface positioned along the optical axis receiving the illumination beam of light from the light source, a forward facing second lens surface positioned along the optical axis forward of the first lens surface transmitting the illumination beam of light to a position forward of the second lens surface onto the bar code symbol and receiving the illumination beam of light that is reflected toward the forward facing second lens from the bar code symbol along a first return optical path commencing at the bar code symbol, a second return optical path commencing at the bar code symbol, a third return optical path commencing at the bar code symbol and a fourth return optical path commencing at the bar code symbol, each of the first, second, third and fourth return optical paths being distinct from the others, the first, second, third and fourth return optical paths being offset from the optical axis, a rearward facing third lens surface transmitting a first portion of the reflected light therethrough along the first return optical path, a rearward facing fourth lens surface transmitting a second portion of the reflected light therethrough along the second return optical path, a rearward facing fifth lens surface transmitting a third portion of the reflected light therethrough along the third return optical path, a rearward facing sixth lens surface transmitting a fourth portion of the reflected light therethrough along the fourth return optical path;
- a first transducer positioned along the first and third return optical paths rearward of the third and fifth lens surfaces and away from the optical axis, the first transducer receiving the first and third portions of the reflected light transmitted by the third and fifth lens surfaces respectively along the first and third return optical paths; and
- a second transducer positioned along the second and fourth return optical paths rearward of the fourth and sixth lens surfaces and away from the optical axis, the second transducer receiving the second and fourth portions of the reflected light transmitted by the fourth and sixth lens surfaces respectively along the second and fourth return optical paths.

23. The apparatus of claim 22 for use with the bar code symbol located within a range of distances from the lens along the optical axis, the range of distances varying from a first distance to a second distance, the second distance being greater than the first distance, the third and fourth surfaces focusing light reflected from the bar code symbol when at the second distance from the lens and the fifth and sixth surfaces focusing light reflected from the bar code symbol when at the first distance.

24. The apparatus of claim 23, wherein the total amount of light contained in the first, second, third and fourth portions of light is substantially constant regardless of where the bar code symbol is located within the range of distances from the lens.

25. The apparatus of claim 24, further comprising a holder that holds the lens in a fixed position relative to the light source and the first and second transducers.

26. The apparatus of claim 25, wherein the holder includes a receiver portion adapted to receive the lens.

27. The apparatus of claim 25, further comprising a retainer that keeps the light source and first and second transducers in fixed positions relative to one another.

28. The apparatus of claim 22, wherein the first lens surface is positioned forward of the third, fourth, fifth and sixth lens surfaces.

29. The apparatus of claim 28, wherein the lens further includes a cavity having a rearward open end positioned adjacent to the third, fourth, fifth and sixth lens surfaces and a forward closed end positioned forward of the third, fourth, fifth and sixth lens surfaces, the first lens surface being formed at the forward end of the cavity.

30. An apparatus for reading a bar code symbol, comprising:
- a light source generating an illumination beam of light along an optical axis;
- a lens having a rearward facing first lens surface positioned along the optical axis receiving the illumination beam of light from the light source, a forward facing second lens surface positioned along the optical axis forward of the first lens surface transmitting the illumination beam of light to a position forward of the second lens surface onto the bar code symbol and receiving the illumination beam of light that is reflected toward the forward facing second lens from the bar code symbol along a first return optical path commencing at the bar code symbol, a second return optical path commencing at the bar code symbol, a third return optical path commencing at the bar code symbol and a fourth return optical path commencing at the bar code symbol, the first, second, third and fourth return optical paths being distinct and offset from the others, a rearward facing third lens surface transmitting a first portion of the reflected light therethrough along the first return optical path, a rearward facing fourth lens surface transmitting a second portion of the reflected light therethrough along the second return optical path, a rearward facing fifth lens surface transmitting a third portion of the reflected light therethrough along the third return optical path, a rearward facing sixth lens surface transmitting a fourth portion of the reflected light therethrough along the fourth return optical path;
- a first transducer positioned along the first and third return optical paths rearward of the third and fifth lens surfaces and receiving the first and third portions of the reflected light transmitted by the third and fifth lens surfaces respectively along the first and third return optical paths; and
- a second transducer positioned along the second and fourth return optical paths rearward of the fourth and sixth lens surfaces and receiving the second and fourth portions of the reflected light transmitted by the fourth and sixth lens surfaces respectively along the second and fourth return optical paths.

31. The apparatus of claim 30, wherein the first lens surface is positioned forward of the third, fourth, fifth and sixth lens surfaces, and the lens further includes a cavity having a rearward open end positioned adjacent to the third, fourth, fifth and sixth lens surfaces and a forward closed end positioned forward of the third, fourth, fifth and sixth lens surfaces, the first lens surface being formed at the forward end of the cavity.

32. The apparatus of claim 30, wherein at least one of the first, second, third or fourth optical paths is offset from the optical axis.

33. An apparatus for reading a bar code symbol, comprising:
- a light source generating an illumination beam of light along an optical axis;
- a first lens positioned along the optical axis receiving the illumination beam of light from the light source and transmitting the illumination beam of light to a position forward of the first lens onto the bar code symbol;
- a second lens receiving a first portion of the illumination beam of light that is reflected from the bar code symbol along a first return optical path commencing at the bar code symbol and transmitting the first portion of the reflected light therethrough along the first return optical path;
- a third lens receiving a second portion of the illumination beam of light that is reflected from the bar code symbol along a second return optical path commencing at the bar code symbol and transmitting the second portion of the reflected light therethrough along the second return optical path, the first and second return optical paths being offset from each other, the first, second and third lens being an integral unit formed from a transparent material;
- a first transducer positioned along the first return optical path rearward of the second lens and receiving the first portion of the reflected light transmitted by the second lens along the first return optical path; and
- a second transducer positioned along the second return optical path rearward of the third lens and receiving the second portion of the reflected light transmitted by the third lens along the second return optical path.

34. An apparatus for reading a bar code symbol, comprising:
- a light source generating an illumination beam of light along an optical axis;
- a first lens positioned along the optical axis receiving the illumination beam of light from the light source and transmitting the illumination beam of light to a position forward of the first lens onto the bar code symbol;
- a second lens receiving a first portion of the illumination beam of light that is reflected from the bar code symbol along a first return optical path commencing at the bar code symbol and transmitting the first portion of the reflected light therethrough along the first return optical path;
- a third lens receiving a second portion of the illumination beam of light that is reflected from the bar code symbol along a second return optical path commencing at the bar code symbol and transmitting the second portion of the reflected light therethrough along the second return optical path;
- a fourth lens receiving a third portion of the illumination beam of light that is reflected from the bar code symbol along a third return optical path commencing at the bar code symbol and transmitting the third portion of the reflected light therethrough along the third return optical path;
- a fifth lens receiving a fourth portion of the illumination beam of light that is reflected from the bar code symbol along a fourth return optical path commencing at the bar code symbol and transmitting the fourth portion of the reflected light therethrough along the fourth return optical path;

a first transducer positioned along the first and third return optical paths rearward of the second and fourth lens and receiving the first and third portions of the reflected light transmitted by the second and fourth lens respectively along the first and third return optical paths; and a second transducer positioned along the second and fourth return optical paths rearward of the third and fifth lens and receiving the second and fourth portions of the reflected light transmitted by the third and fifth lens respectively along the second and fourth return optical paths.

35. The apparatus of claim 34, wherein the first, second, third, fourth and fifth lenses are an integral unit formed from a transparent material.

* * * * *